United States Patent
Liu et al.

(10) Patent No.: US 11,837,729 B2
(45) Date of Patent: Dec. 5, 2023

(54) CONDUCTING POLYMER NETWORK-PROTECTED CATHODE ACTIVE MATERIALS FOR LITHIUM SECONDARY BATTERIES

(71) Applicant: Global Graphene Group, Inc., Dayton, OH (US)

(72) Inventors: Mingrui Liu, Dayton, OH (US); Hao-Hsun Chang, Centerville, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 204 days.

(21) Appl. No.: 16/824,039

(22) Filed: Mar. 19, 2020

(65) Prior Publication Data
US 2021/0296650 A1   Sep. 23, 2021

(51) Int. Cl.
| | |
|---|---|
| *H01M 4/62* | (2006.01) |
| *H01M 4/131* | (2010.01) |
| *H01M 4/1391* | (2010.01) |
| *H01M 4/525* | (2010.01) |
| *H01M 4/505* | (2010.01) |
| *H01M 10/0525* | (2010.01) |
| *H01M 4/02* | (2006.01) |

(52) U.S. Cl.
CPC .......... *H01M 4/622* (2013.01); *H01M 4/131* (2013.01); *H01M 4/1391* (2013.01); *H01M 4/505* (2013.01); *H01M 4/525* (2013.01); *H01M 10/0525* (2013.01); *H01M 2004/028* (2013.01)

(58) Field of Classification Search
CPC .......... H01M 10/052; H01M 10/0525; H01M 2004/028; H01M 4/131; H01M 4/1391; H01M 4/505; H01M 4/525; H01M 4/62; H01M 4/622; H01M 4/624; H01M 4/625
See application file for complete search history.

(56) References Cited

U.S. PATENT DOCUMENTS

| | | | |
|---|---|---|---|
| 2,798,878 A | 7/1957 | Hummers | |
| 7,071,258 B1 | 7/2006 | Jang et al. | |
| 2005/0271574 A1 | 12/2005 | Jang et al. | |
| 2008/0048152 A1 | 2/2008 | Jang et al. | |
| 2009/0081548 A1* | 3/2009 | Nakura | H01M 10/052 429/231.95 |
| 2009/0104529 A1* | 4/2009 | Nishino | H01M 10/0525 429/231.95 |
| 2012/0270106 A1* | 10/2012 | Todorov | H01M 10/052 429/223 |
| 2018/0294474 A1* | 10/2018 | Zhamu | C08K 3/22 |
| 2021/0036318 A1* | 2/2021 | Kim | C01G 51/006 |

FOREIGN PATENT DOCUMENTS

JP   2005026141 A   *   1/2005

OTHER PUBLICATIONS

Hummers et al., "Preparation of graphitic oxide" J. Am. Chem. Soc. (1958) vol. 80, p. 1339.
Karlicky et al., "Halogenated Graphenes: Rapidly Growing Family of Graphene Derivatives" ACS Nano (2013) vol. 7, No. 8, pp. 6434-6464.

* cited by examiner

*Primary Examiner* — Carlos Barcena

(57) ABSTRACT

Provided is a composite particulate for use in a lithium battery cathode, the composite particulate comprising one or a plurality of particles of a cathode active material encapsulated by or embedded in an electrically and/or ionically conducting polymer gel network, wherein the cathode active material is selected from the group of lithium nickel cobalt metal oxides having a general formula $Li_xNi_yCo_zM_wO_2$, where M is selected from the group consisting of aluminum (Al), titanium (Ti), tungsten (W), chromium (Cr), molybdenum (Mo), magnesium (Mg), beryllium (Be), calcium (Ca), tantalum (Ta), silicon (Si), and combinations thereof and x ranges from 0 to 1.2, the sum of y+z+w ranges from 0.8 to 1.2, w ranges from 0 to 0.5, y and z are both greater than zero, and the ratio z/y ranges from 0 to 0.5.

19 Claims, 7 Drawing Sheets

CONDUCTING POLYMER NETWORK-PROTECTED CATHODE ACTIVE MATERIALS FOR LITHIUM SECONDARY BATTERIES

FIELD

The present disclosure relates generally to the field of lithium batteries and, in particular, to conducting polymer network-protected lithium multiple transition metal oxides for use as cathode active materials for lithium-ion or lithium metal secondary batteries.

BACKGROUND

Next generation lithium-ion batteries (LIBs) are a prime candidate for energy storage devices within aircraft, electric vehicles (EVs), drones, renewable energy storage, and smart grid applications. The emerging EV and renewable energy industries demand the availability of rechargeable batteries with a significantly higher energy and power density than what current LIB technology can provide. This requirement has triggered considerable research efforts on the development of both anode and cathode materials with a higher specific capacity, excellent rate capability, and good cycle stability for LIBs.

The most commonly used anode active materials for lithium-ion batteries are natural graphite and synthetic graphite (or artificial graphite) that can be intercalated with lithium and the resulting graphite intercalation compound may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g. Other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

Commonly used cathode active materials for lithium-ion batteries include lithium nickel manganese cobalt oxide ("NMC" or "NCM", $LiNi_xMn_yCo_zO_2$), lithium nickel cobalt aluminum oxide ("NCA", $LiNiCoAlO_2$), lithium manganese oxide ("LMO", $LiMn_2O_4$), lithium iron phosphate ("LFP", $LiFePO_4$), and lithium cobalt oxide ($LiCoO_2$, "LCO"), etc. The practical or currently achievable specific capacities of these commonly used cathode active materials are typically in the range from 140-200 mAh/g (more typically 150-180 mAh/g), leading to low specific energy (gravimetric energy density, Wh/kg) and low energy density (volumetric energy density, Wh/L).

An urgent need exists to have a high-capacity cathode active material to pair up with a high-capacity anode active material, such as Si, SiO, Sn, and $SnO_2$, for the purpose of achieving high specific energies and high energy densities.

Due to extremely poor electrical conductivity of all cathode (positive electrode) active materials in a lithium-ion or lithium metal, a conductive additive (e.g. carbon black, fine graphite particles, expanded graphite particles, or their combinations), typically in the amount of 5%-15%, must be added into the electrode. These conductive additives are not active materials and are incapable of storing lithium ions. Excessive use of these conductive additives significantly reduces the proportion of active materials, leading to reduced energy densities of a lithium cell.

Thus, an urgent need exists for a conductive material that provides a 3D network of electron-conducting pathways without the use of an excessive amount of conductive additives that are non-active materials (that adds weight and volume to the battery without providing additional capacity of storing lithium ions).

Further, such conductive materials preferably are also effective in imparting other useful functions to a lithium-ion battery, such as preventing direct contact between a liquid electrolyte and a transition metal in a cathode active material for the purpose of reducing transition metal-induced decomposition of the electrolyte.

SUMMARY

It may be noted that the word "electrode" herein refers to either an anode (negative electrode) or a cathode (positive electrode) of a battery. These definitions are also commonly accepted in the art of batteries or electrochemistry.

The present disclosure provides a composite particulate or multiple composite particulates for use in a cathode of a lithium-ion battery or lithium metal battery, wherein the composite particulate comprises one or a plurality of particles of a cathode active material encapsulated by or embedded in an electrically and/or ionically conducting polymer gel network. The encapsulated cathode active material is preferably selected from the group of lithium nickel cobalt metal oxides having a general formula $Li_xNi_yCo_zM_wO_2$, where M is selected from the group consisting of aluminum (Al), titanium (Ti), tungsten (W), chromium (Cr), molybdenum (Mo), magnesium (Mg), beryllium (Be), calcium (Ca), tantalum (Ta), silicon (Si), and combinations thereof and x ranges from 0 to 1.2 (can be varied within this range by electrochemical insertion and extraction), the sum of y+z+w ranges from 0.8 to 1.2, w is from 0.25 to 0.5, y and z are both greater than zero, and the ratio z/y ranges from 0 to 0.5. It may be noted that M can be a combination of multiple elements. A particularly desired class of cathode active materials contains M that is selected from Be, Mg, Ca and their various combinations and their combinations with Mn (manganese) and/or Al (aluminum). It may be further noted that the lithium-ion cell has a higher specific capacity when w is from 0 to 0.25 and has a more stable cycling behavior if w is from 0.25 to 0.5.

In certain embodiments, M is selected from the group consisting of beryllium (Be), calcium (Ca), and combinations thereof with aluminum (Al), titanium (Ti), tungsten (W), chromium (Cr), molybdenum (Mo), magnesium (Mg), tantalum (Ta), and silicon (Si), and x ranges from 0 to 1.2, the sum of y+z+w ranges from 0.8 to 1.2, w is from 0 to 0.5, y and z are both greater than zero, and the ratio z/y ranges from 0 to 0.5.

In some embodiments of the general formula of $Li_xNi_yCo_zM_wO_2$, M comprises multiple elements selected from selected from the group consisting of aluminum (Al), titanium (Ti), tungsten (W), chromium (Cr), molybdenum (Mo), magnesium (Mg), beryllium (Be), calcium (Ca), tantalum (Ta), silicon (Si), and combinations thereof. M may be a in the form of $M^0_a$, $M^0_aM^1_b$, or $M^0_aM^1_bM^2_c$, where $M^0$, $M^1$ and $M^2$ are elements selected from the group consisting of aluminum (Al), titanium (Ti), tungsten (W), chromium (Cr), molybdenum (Mo), magnesium (Mg), beryllium (Be), calcium (Ca), tantalum (Ta), and silicon (Si), wherein a+b+c=w. In some embodiments $M_w$ comprises multiple elements and w is equal to the sum of M elements in the $Li_xNi_y Co_zM_wO_2$.

In certain embodiments, M comprises elements selected from combined Be and Mg, combined Ca and Mg, combined Ca and Be, or combined Be, Mg, and Ca. In some embodiments, M contains $Be_aMg_bCa_c$, where a+b+c=w and in some embodiments a, b, and c are all non-zero figures.

The cathode active material may be in a form of fine particles having a dimension from 10 nm to 50 μm, more preferably from 50 nm to 10 μm.

In certain embodiments, the composite particulate further comprises graphene sheets that are embedded or dispersed in the conducting polymer gel network. However, the external surfaces of the composite particulate may or may not contain graphene sheets that encapsulate the conducting polymer network/cathode particle core.

Preferably, the electrically conducting polymer gel network contains a conjugated polymer selected from polyacetylene, polythiophene, poly(3-alkylthiophenes), polypyrrole, polyaniline, poly(isothianaphthene), poly(3,4-ethylenedioxythiophene) (PEDOT), alkoxy-substituted poly (p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1, 2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

In some preferred embodiments, the conducting polymer gel network comprises a polyaniline hydrogel, polypyrrole hydrogel, or polythiophene hydrogel in a dehydrated state. Such a conducting polymer gel network is typically a lightly crosslinked polymer.

In some embodiments, the ionically conducting polymer gel network comprises a polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly (vinylidene fluoride)-hexafluoropropylene, cyanoethyl poly (vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

In certain alternative embodiments, the disclosure provides multiple composite particulates for a lithium battery, at least one of the composite particulates comprising one or a plurality of particles of a cathode active material as described above and graphene sheets that are embedded in, dispersed in, or encapsulated by a conducting polymer gel network. However, the exterior surface of the composite particulate does not contain graphene sheets. The dispersed or embedded graphene sheets are preferably selected from pristine graphene, graphene oxide (GO), reduced graphene oxide (RGO), graphene fluoride, graphene chloride, graphene bromide, graphene iodide, nitrogenated graphene, hydrogenated graphene, doped graphene, chemically functionalized graphene, or a combination thereof.

In some embodiments, the conducting polymer gel network is reinforced with a high-strength material selected from carbon nanotubes, carbon nano-fibers, carbon or graphite fibers, graphene sheets, expanded graphite flakes, polymer fibrils, glass fibers, ceramic fibers, metal filaments or metal nano-wires, whiskers, or a combination thereof.

In certain embodiments, the particulate further comprises from 0.1% to 40% by weight of a lithium ion-conducting additive dispersed in the conducting polymer gel network. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$. Alternatively, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium (LiN$(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The disclosure also provides a powder mass of multiple particles of the cathode active material as defined above. Also provided is a lithium battery cathode electrode containing a mass of this type and optional conductive filler (typically 0-15% by weight) and optional binder (typically 0-15% by weight). In some embodiments, the disclosure provides a lithium battery containing such a cathode electrode. In some embodiments, the provided lithium-ion cell or lithium metal secondary cell comprises an anode, a cathode as described above, and an electrolyte in ionic contact with the anode and the cathode.

The anode in the lithium-ion cell or lithium metal secondary cell may comprise an anode active material selected from the group consisting of: (a) silicon (Si), germanium (Ge), phosphorus (P), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, P, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium niobium oxide, lithium titanium-niobium oxide, lithium aluminate, lithium-containing titanium oxide, lithium transition metal oxide, $ZnCo_2O_4$; (f) particles of graphite; (g) lithium metal or lithium alloy containing greater than 80% by weight of lithium; and combinations thereof.

The disclosure further provides a method of producing the cathode active material as described above, wherein the method comprises a procedure selected from co-precipitation, spray-drying, solid-state reaction, or combustion.

The present disclosure also provides a process for producing multiple composite particulates of conducting polymer gel network-protected particles of a cathode active material for a lithium battery. In certain embodiments, the process comprises (A) dispersing multiple particles of the desired cathode active material $Li_xNi_yCo_zM_wO_2$ in a reacting mass comprising a monomer (along with an initiator or catalyst, a curing or cross-linking agent, etc.) or an oligomer (low molecular weight, growing chains) to form a reacting slurry (suspension, dispersion, etc.); (B) forming the reacting slurry into multiple reacting droplets, wherein the droplet comprises one or a plurality of cathode active material particles dispersed in a matrix of polymerizing or cross-linking chains; and (C) converting the polymerizing or cross-linking chains into a network polymer in the droplets to form the composite particulates of polymer gel network-protected $Li_xNi_yCo_zM_wO_2$ particles. Steps (B) and (C) may be conducted concurrently or sequentially.

Step (B) of forming reacting droplets may be accomplished by operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, or a combination thereof.

In some embodiments, the reacting mass used in step (A) may contain a monomer, an initiator or catalyst, a cross-linking or gelating agent, an oxidizer and/or a dopant. Before, during or after the droplet formation procedure, one may initiate the polymerization and crosslinking reactions to produce lightly cross-linked networks of conducting polymer chains inside the droplets and on the droplet surfaces. These networks of polymer chains, if impregnated with water or an organic liquid solvent, can become a gel. In composite the particulate, the nanowires, along with optional graphene sheets and other conductive additives (e.g. CNTs), are embedded in, dispersed in, or encapsulated by the conducting polymer network gel.

DETAILED DESCRIPTION OF PREFERRED EMBODIMENTS

Figure 1:
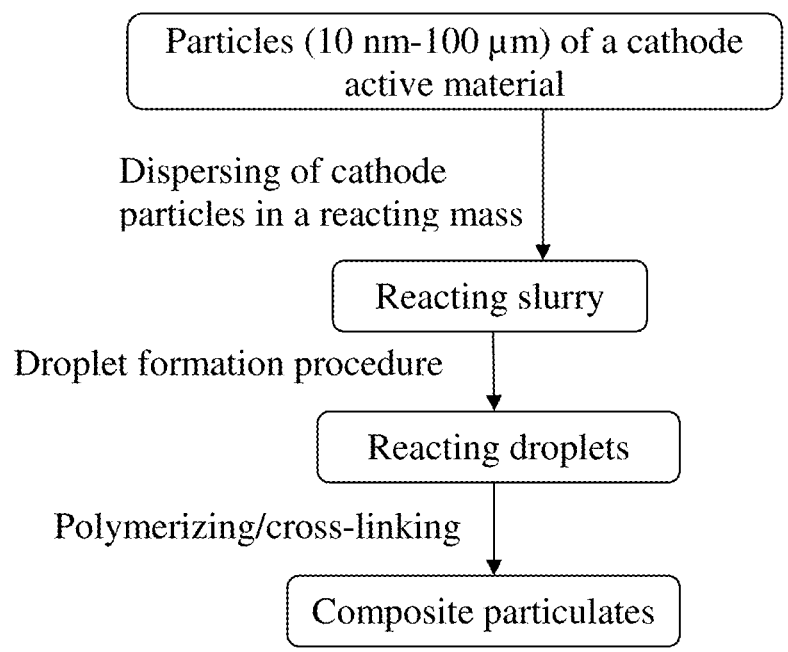
FIG. 1 Process flow chart for producing composite particulates comprising conductive polymer network-protected cathode active material particles.

The disclosure provides a composite particulate or multiple composite particulates for use in a lithium-ion or lithium metal battery cathode, wherein the composite particulate comprises one or a plurality of particles of a cathode active material encapsulated by or embedded in an electrically and/or ionically conducting polymer gel network. The cathode active material is selected from the group of lithium cobalt metal oxides having a general formula $Li_xNi_y$-$Co_zM_wO_2$, where M is selected from the group consisting of aluminum (Al), titanium (Ti), tungsten (W), chromium (Cr), molybdenum (Mo), magnesium (Mg), beryllium (Be), calcium (Ca), tantalum (Ta), silicon (Si), and combinations thereof and x is from about 0 to about 1 (can be varied within this range by electrochemical insertion and extraction), the sum of y+z+w is about 1, w is from above 0 to about 0.5, y and z are both greater than zero, and the ratio z/y ranges from above 0 to about 1/3.

Preferably, the cathode active material is selected from the group of lithium nickel cobalt metal oxides having a general formula $Li_xNi_yCo_zM_wO_2$, where M is selected from the group consisting of beryllium (Be), calcium (Ca), and combinations thereof with aluminum (Al), titanium (Ti), tungsten (W), chromium (Cr), molybdenum (Mo), magnesium (Mg), tantalum (Ta), and silicon (Si), and x is from about 0 to about 1, the sum of y+z+w is about 1, w is from above 0 to about 0.5, y and z are both greater than zero, and the ratio z/y ranges from above 0 to about 1/3.

Further preferably, M comprises multiple elements selected from combined Be and Mg, combined Ca and Mg, combined Ca and Be, or combined Be, Mg, and Ca. In some preferred embodiments of instant disclosure, M contains $Be_aMg_bCa_c$, where a+b+c=w and most preferably, a, b, and c are all non-zero figures.

Preferably, the electrically conducting polymer gel network contains a conjugated polymer selected from polyacetylene, polythiophene, poly(3-alkylthiophenes), polypyrrole, polyaniline, poly(isothianaphthene), poly(3,4-ethylenedioxythiophene) (PEDOT), alkoxy-substituted poly (p-phenylene vinylene), poly(2,5-bis(cholestanoxy) phenylene vinylene), poly(p-phenylene vinylene), poly(2,5-dialkoxy) paraphenylene vinylene, poly[(1,4-phenylene-1, 2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

Further preferably, the conducting polymer gel network comprises a polyaniline network, polypyrrole network, or polythiophene network. Such a conducting polymer network is typically a lightly crosslinked polymer, capable of elastically deforming to a significant extent (typically at least >10% and can be higher than 50% under tension). Elastic deformation means that the deformation is reversible.

The ionically conducting polymer gel network preferably may comprise a polymer selected from poly(ethylene oxide), polypropylene oxide, poly(ethylene glycol), poly (acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly (ethylene glycol) diacrylate or poly(ethylene glycol) methyl ether acrylate, a sulfonated derivative thereof, or a combination thereof.

This class of cathode active material is generally related to lithium metal oxides containing nickel, cobalt, and a third element, typically a metal (M). M may represent a combination of 2, 3, or more elements. It may be noted that if M is not a metal with a valence state of +3 (e.g., magnesium, beryllium, and calcium with a valence state of +2, or silicon with a valence of +4), the sum of y+z+w may deviate somewhat from 1. For metals of valence +2, such as magnesium, beryllium, and calcium, the sum will be slightly larger than 1 in order to balance the −4 charge on the two oxygen atoms. For elements of valence +4, such as silicon, the sum will be slightly less than 1.

In general, these compounds have the layered structure of α-NaCrO$_2$ crystals, wherein lithium ions can move through the lattice rapidly, along the lattice planes. This structure is also found in LiCoO$_2$ and LiNiO$_2$, which are a significantly different structure than the LiMn$_2$O$_4$ spinel structure. Further, these compounds have a significantly greater variation in potential with state of charge (i.e., sloping discharge profile) than the corresponding simple oxides, particularly LiCoO$_2$. The element nickel appears to impart a very high capacity to these compounds. Depending upon the relative amounts of cobalt and other metals in the compound, any given compound may have a reversible capacity typically in the range from 180 to 215 mAh/g. For comparison, LiCoO$_2$ has an observed capacity of about 139-148 mAh/g and LiMn$_2$O$_4$ has an observed capacity of about 120-148 mAh/g. Cobalt appears to be capable of improving the stability of the compound by holding other transition metal atoms, especially nickel, in place within the lattice.

The presence of the third element or elements (M) in the lattice is believed to be able to improve cell safety on overcharge. The lithium metal oxides, particularly lithium nickel oxide, may undergo exothermic decomposition with the release of oxygen on overcharge. This and other detrimental overcharge reactions may be reduced if the lithium metal oxide compound becomes less conductive in a highly delithiated state.

A particularly desired class of cathode materials contains M that is selected from Be, Mg, Ca and their various combinations and their combinations with Mn (manganese) and/or Al (aluminum). The present of these elements appear to impact cycling stability to the lithium-ion cells containing these cathode active materials.

Several methods have been proposed to produce lithium mixed transition metal oxides: the co-precipitation method, spray drying method, high temperature solid state reaction, and combustion method.

Co-precipitation method is a useful preparation process for the industrial production of lithium mixed transition metal oxide-based cathode active materials. This method can be used to synthesize precursor with excellent spherical morphology and good element mixing at an atomic level. The precipitation conditions such as co-precipitation temperature, pH value of solution, and stirring intensity play a critical role in the performance of precursor.

For example, for hydroxide co-precipitation conditions of Ni$_{0.6}$Co$_{0.2}$Mn$_{0.2}$(OH)$_2$, the particles became small with an increase in the pH value, while the particles of precursor became quasi-spherical with increasing chelating agent concentration and stirring speed. When the Co content in Ni$_{0.6}$MnCo(OH)$_2$ increased, the tap-density and the initial discharge capacity of NCM622 increased, but their cycling stability decreased owing to the acceleration of grain growth. The NCM622 cathode materials with the concentration gradient of Mn and Ni elements were synthesized using hydroxide co-precipitation method.

Spray drying is another useful method to synthesize the cathode materials with good atomic level mixing of elements. The resulting cathode active material particles are smaller and quasi-spherical. Furthermore, the spray drying method can achieve continuous production with an automatic control and can have high production efficiency. However, the large-scale production of spray drying method can be challenging due to the complicated process and the required high precision of the equipment.

Compounds having the formula Li$_x$Ni$_y$Co$_z$M$_w$O$_2$ may be prepared by high temperature solid state reactions in the following. The process typically begins with mixing a desired lithium-containing compound, a specified element M-containing compound (e.g., Al, Mg, Be, Ca, etc.), a cobalt-containing compound, and a nickel-containing compound. The various components are homogeneously mixed and then thermally reacted at a temperature of between about 500° C. and 1300° C. For many compounds, the preferred reaction temperature is between about 600° C. and 1000° C., and most preferably between about 750° C. and 850° C. Further, the reaction is preferably conducted in an atmosphere of flowing air or, more preferably, flowing oxygen.

The desired lithium-containing compound may be any one or more of lithium nitrate (LiNO$_3$), lithium hydroxide (LiOH), lithium acetate (LiO$_2$CCH$_3$), and lithium carbonate (Li$_2$CO$_3$), for example. The cobalt-containing compound may be any one or more of cobalt metal, cobalt oxide (Co$_3$O$_4$ or CoO), cobalt carbonate (CoCO$_3$), cobalt nitrate (Co(NO$_3$)$_2$), cobalt hydroxide (Co(OH)$_2$), and cobalt acetate (Co(O$_2$CCH$_3$)$_2$), for example. The nickel containing compound may be any one or more of nickel metal, nickel oxide (NiO), nickel carbonate (NiCO$_3$), nickel acetate (Ni(O$_2$CCH$_3$)$_2$), and nickel hydroxide (Ni(OH)$_2$), for example. If the M-containing compound is to provide aluminum, this compound may be selected from any one or more of aluminum hydroxide (Al(OH)$_3$), aluminum oxide (Al$_2$O$_3$), aluminum carbonate (Al$_2$(CO$_3$)$_3$), and aluminum metal, for example. Other M-containing materials may be employed to provide non-aluminum containing materials such as magnesium oxide (MgO), beryllium oxide (BeO), calcium oxide (CaO), metal calcium (Ca), molybdenum oxide (MoO$_3$), titanium oxide (TiO$_2$), tungsten oxide (WO$_2$), chromium metal, chromium oxide (CrO$_3$ or Cr$_2$O$_3$), tantalum oxide (Ta$_2$O$_4$ or Ta$_2$O$_5$), etc.

Alternatively, one may simply combine the simple lithium oxides of the metals and heat-treat the mixture to form the final compound. This process entails combining lithium cobalt oxide, lithium nickel oxide, and a lithium metal oxide of the formula LiMO$_2$, where M is preferably magnesium, aluminum, chromium, or titanium. For instance, in order to obtain LiNi$_{0.6}$Co$_{0.15}$Al$_{0.25}$O$_2$, metal oxides, including LiNiO$_2$, LiCoO$_2$, and LiAlO$_2$, could be mixed in a 60:15:25 molar ratio. The resulting mixture is then reacted at high temperatures as described above.

In the combustion synthesis, the organic metal salts are usually first mixed with nitric acid/urea, and then the resulting mixture is heated directly to the ignition temperature. Finally the cathode materials are synthesized by the exothermic heat of the material in the chemical reaction. The combustion method is known for its main advantages of simple equipment, low cost, and being without external energy. But it is restricted because of the shortcomings of large particle size and poor controllability.

The disclosed composite particulates may comprise one or a plurality of particles of a cathode active material Li$_x$Ni$_y$Co$_z$M$_w$O$_2$ and optional graphene sheets that are embedded in, dispersed in, or encapsulated by a conducting polymer gel network. The exterior surface of the composite particulate may or may not contain graphene sheets. The dispersed or embedded graphene sheets are preferably selected from pristine graphene, graphene oxide (GO), reduced graphene oxide (RGO), graphene fluoride, graphene chloride, graphene bromide, graphene iodide, nitrogenated graphene, hydrogenated graphene, doped graphene, chemically functionalized graphene, or a combination thereof.

Preferably, the encapsulating or embedding conducting polymer network (optionally containing a conductive additive, such as graphene sheets and carbon nanotubes, dispersed therein) has a lithium ion conductivity from $10^{-8}$ S/cm to $10^{-2}$ S/cm (more typically from $10^{-5}$ S/cm to $10^{-3}$ S/cm) when measured at room temperature. The conducting network preferably has an electrical conductivity from $10^{-7}$ S/cm to 3,000 S/cm, up to 20,000 S/cm (more typically from $10^{-4}$ S/cm to 1000 S/cm) when measured at room temperature on a separate cast thin film 20 μm thick.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

A graphene sheet or nano graphene platelet (NGP) is essentially composed of a sheet of graphene plane or multiple sheets of graphene plane stacked and bonded together (typically, on an average, less than 10 sheets per multi-layer platelet). Each graphene plane, also referred to as a graphene sheet or a hexagonal basal plane, comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene and some few-layer graphene sheets (<10 layers). The length and width of a NGP are typically between 200 nm and 20 μm, but could be longer or shorter, depending upon the sizes of source graphite material particles.

Figure 2:
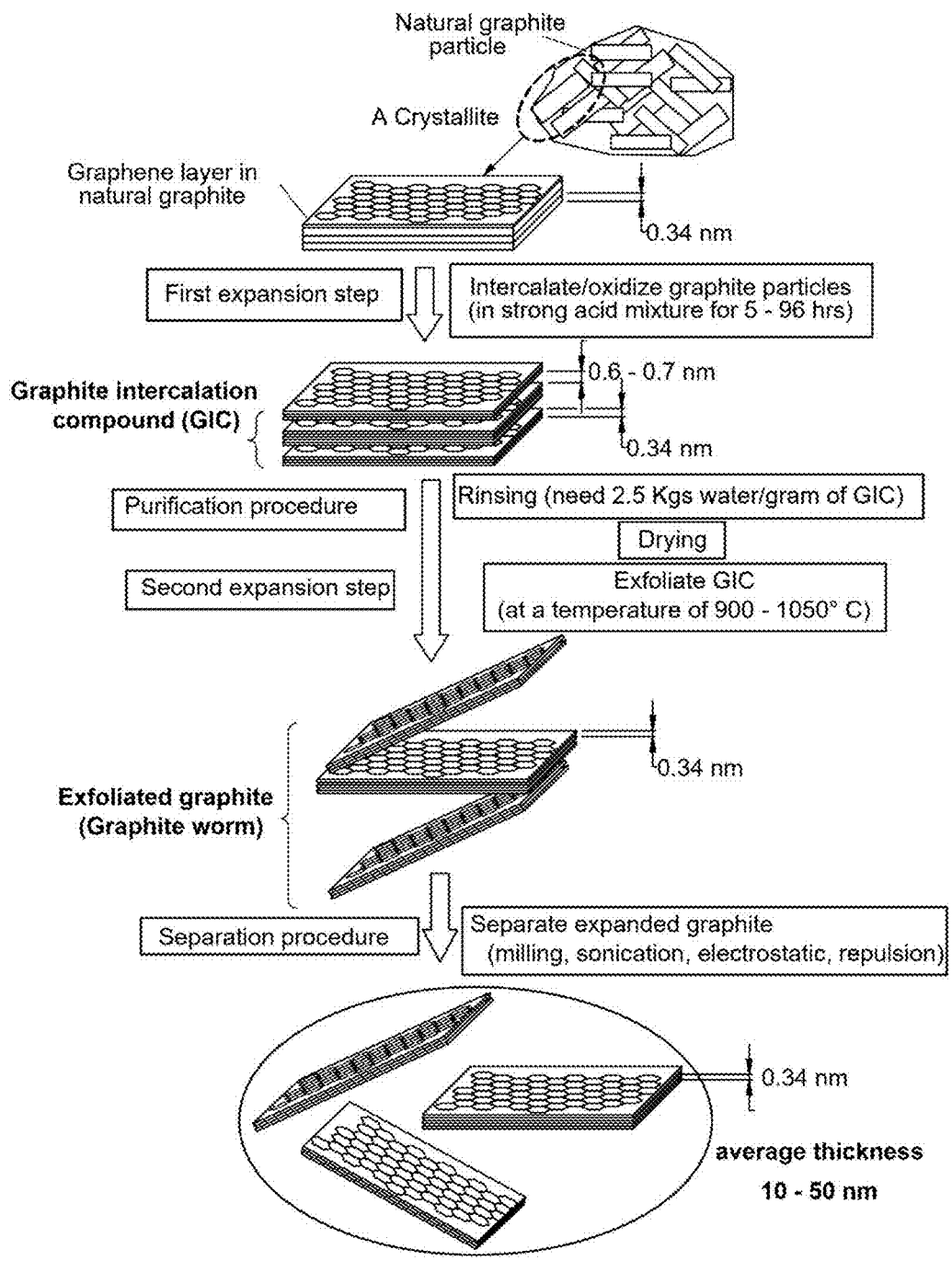
FIG. 2 A flow chart showing the most commonly used prior art process for producing highly oxidized graphene sheets (or nano graphene platelets, NGPs) that entails chemical oxidation/intercalation, rinsing, and exfoliation procedures.

The processes for producing various types of graphene sheets are well-known in the art. As shown in FIG. 2, the chemical processes for producing graphene sheets or platelets typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water. The resulting suspension may be subjected to ultrasonication for yielding isolated graphene sheets.

Alternatively, the resulting suspension may be subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets, as herein prepared) exhibit electrical conductivity values in the range from 1,500-4,500 S/cm. In contrast, the RGO paper prepared by the same paper-making procedure typically exhibits electrical conductivity values in the range from 100-1,000 S/cm.

As illustrated in FIG. 1, The preparation of conducting polymer gel network-embraced cathode active material particles may begin with dispersing pre-made cathode active material particles and optional graphene sheets in a reactive precursor solution (e.g. a monomer, an initiator, and a curing or cross-linking agent) to form a suspension. The suspension is then dried (e.g. using spray drying) to form reactive micro-droplets comprising the reactive precursor, which is polymerized/cured, concurrently or subsequently, to obtain composite particulates. In these composite particulates, graphene sheets, if present, are included inside the micro-droplets (i.e. internal graphene sheets embedded in or encapsulated by the conducting polymer gel network).

Thus, the present disclosure also provides a process for producing multiple composite particulates of conducting polymer gel network-protected particles of a cathode active material for a lithium battery. In certain embodiments, the process comprises (A) dispersing multiple particles of the desired cathode active material $Li_xNi_yCo_zM_wO_2$ in a reacting mass comprising a monomer (along with an initiator or catalyst, a curing or cross-linking agent, etc.) or an oligomer (low molecular weight, growing chains) to form a reacting slurry (suspension, dispersion, etc.); (B) forming the reacting slurry into multiple reacting droplets, wherein the droplet comprises one or a plurality of cathode active material particles dispersed in a matrix of polymerizing or cross-linking chains; and (C) converting the polymerizing or cross-linking chains into a network polymer in the droplets to form the composite particulates of polymer gel network-protected $Li_xNi_yCo_zM_wO_2$ particles. Steps (B) and (C) may be conducted concurrently or sequentially.

In some embodiments, prior to the instant polymer embracing process, the desired cathode active material contains particles that are pre-coated with a coating of a conductive material selected from carbon, pitch, carbonized resin, a conductive polymer, a conductive organic material, a graphene coating (e.g. graphene sheets), a metal coating, a metal oxide shell, or a combination thereof. The coating layer thickness is preferably in the range from 1 nm to 10 μm, preferably from 2 nm to 1 μm, and further preferably from 5 nm to 100 nm.

In some embodiments, the solid cathode active material contains particles that are, prior to being embedded in a conducting polymer network, pre-coated with a carbon precursor material selected from a coal tar pitch, petroleum pitch, meso-phase pitch, polymer, organic material, or a combination thereof. The method further contains a step of heat-treating the precursor to convert the carbon precursor material to a carbon material coated on active material nanowire surfaces.

Several micro-encapsulation processes require the conductive polymer to be dissolvable in a solvent or its precursor (or monomer or oligomer prior) initially contains a liquid state (flowable). Fortunately, all the polymers used herein are soluble in some common solvents or the monomer or other polymerizing/curing ingredients themselves are in a liquid state to begin with. This solution can then be used to provide a mixture of cathode active material particles and a reacting polymer (along with an optional conductive materials, such as graphene sheets, CNTs, and CNFs) to form into composite particulates via several of the micro-encapsulation methods discussed in what follows.

There are three broad categories of micro-encapsulation methods that can be implemented to produce conducting polymer network embedded or encapsulated cathode particles (the micro-droplets): physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-Coating Method:

The pan coating process involves tumbling the cathode active material particles in a pan or a similar device while the matrix or encapsulating material (e.g. monomer/oligomer liquid or polymer/solvent solution) is applied slowly until multiple particulates containing cathode active material particles dispersed in a conductive polymer network are obtained.

Air-Suspension Coating Method:

In the air suspension coating process, the cathode active material particles are dispersed into the supporting air stream in an encapsulating chamber. A controlled stream of a polymer-solvent solution (e.g. polymer or its monomer or oligomer dissolved in a solvent; or its monomer or oligomer alone in a liquid state) is concurrently introduced into this chamber, allowing the solution to hit and coat the suspended cathode active material particles. These suspended particles are encapsulated (fully coated) with or dispersed in a polymer or reactive precursor (monomer, oligomer, etc. which is polymerized/cured concurrently or subsequently) while the volatile solvent is removed. This process may be repeated several times until the required parameters, such as full-coating thickness (i.e. encapsulating shell or wall thickness), are achieved. The air stream which supports the cathode particles also helps to dry them, and the rate of drying is directly proportional to the temperature of the air stream, which can be adjusted for optimized shell thickness.

In a preferred mode, the cathode active material particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal Extrusion:

Cathode active material particles may be encapsulated with a polymer or precursor material using a rotating extrusion head containing concentric nozzles. In this process, a stream of core fluid (slurry containing cathode active material particles dispersed in a solvent) is surrounded by a sheath of shell solution or melt containing the polymer or precursor. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry.

Vibrational Nozzle Encapsulation Method:

Core-shell encapsulation or matrix-encapsulation of cathode active material particles can be conducted using a laminar flow through a nozzle and vibration of the nozzle or the liquid. The vibration has to be done in resonance with the Rayleigh instability, leading to very uniform droplets. The liquid can include any liquids with limited viscosities (1-50,000 mPa·s): emulsions, suspensions or slurry containing the cathode active material particles and the polymer or precursor. The solidification can be done according to the used gelation system with an internal gelation.

Spray-Drying:

Spray drying may be used to encapsulate cathode active material particles when the particles are suspended in a melt or polymer/precursor solution to form a suspension. In spray drying, the liquid feed (solution or suspension) is atomized to form droplets which, upon contacts with hot gas, allow solvent to get vaporized and thin polymer shell or matrix to fully embrace the particles. If pre-made graphene sheets are included in the suspension, the micro-droplets formed may contain graphene sheets in the matrix of the composite particulates.

Coacervation-Phase Separation:

This process includes three steps carried out under continuous agitation:

(a) Formation of three immiscible chemical phases: liquid manufacturing vehicle phase, core material phase and encapsulation material phase. The cathode active material particles are dispersed in a solution of the encapsulating polymer or precursor. The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: cathode active material particles being dispersed in the encapsulating polymer solution, encapsulating polymer/precursor coated around cathode active material particles, and deposition of liquid polymer embracing around cathode active material particles by polymer adsorbed at the interface formed between core material and vehicle phase; and (c) Hardening of encapsulating shell material: shell material being immiscible in vehicle phase and made rigid via thermal, cross-linking, or dissolution techniques.

In-Situ Polymerization:

In some micro-encapsulation processes, cathode active material particles are fully coated with a monomer or oligomer first. Then, direct polymerization of the monomer or oligomer is carried out on the surfaces of these particles.

Matrix Polymerization:

This method involves dispersing and embedding cathode active material particles in a polymeric matrix during formation of the particulates. This can be accomplished via spray-drying, in which the particulates are formed by evaporation of the solvent from the matrix material. Another possible route is the notion that the solidification of the matrix is caused by a chemical change.

In some embodiments, the cathode active material particles include powder, flakes, beads, pellets, spheres, wires, fibers, filaments, discs, ribbons, or rods, having a diameter or thickness from 10 nm to 20 μm. Preferably, the diameter or thickness is from 1 μm to 10 μm.

Multiple composite particulates of the presently disclosed cathode active material may be made into powder mass. This powder mass may be used as a cathode active material for a lithium-ion cell or lithium metal secondary cell.

The anode in the lithium-ion cell or lithium metal secondary cell may comprise an anode active material selected from the group consisting of: (a) silicon (Si), germanium (Ge), phosphorus (P), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, P, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium niobium oxide, lithium titanium-niobium oxide, lithium aluminate, lithium-containing titanium oxide, lithium transition metal oxide, $ZnCo_2O_4$; (f) particles of graphite; (g) lithium metal or lithium alloy containing greater than 80% by weight of lithium; and combinations thereof.

A wide range of electrolytes can be incorporated into the lithium cells: liquid electrolyte, polymer gel electrolyte, polymer electrolyte, solid state electrolyte, composite electrolyte, etc. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly including a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range from 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methane-sulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably from 0.5 to 2.0 mol/l.

The following examples serve to provide the best modes of practice for the present disclosure and should not be construed as limiting the scope of the disclosure:

Example 1: Production of $LiNi_{0.75}Al_{0.25}O_2$ and $LiNi_{0.6}Co_{0.05}Mg_{0.3}Al_{0.05}O_2$ Particles Particles of $LiNi_{0.75}Al_{0.25}O_2$ (as a prior art baseline material) was prepared by combining 1.05 moles of vacuum-dried $LiNO_3$ powder (100° C., 4 hours) with 1.0 mole of a mixture of NiO and $Al(OH)_3$ reactants at a molar ratio of 75/25 of Ni/Al. A good mix of the reactants was obtained by continuously rotating a plastic container containing the chemicals and some stainless steel balls on a machine at about 60 rpm for 1 hour. The resulting mixture was compressed into pellets in a press at 4500 lb/in². The pellets then were placed into an alumina crucible, and heated in a retort furnace (a) first under a flowing argon atmosphere at 400° C. for 4 hours (to safely remove $NO_2$ and other gaseous products), followed by (b) heating under a flowing oxygen atmosphere at 750° C. for 16 hours. The reacted pellets were then crushed, ground, and sieved to less than 63

μm, following by a washing step with deionized water and vacuum drying the powder (to remove any remaining water soluble reactants or unwanted products). Next, the powder was compressed into a pellet at 4500 lb/in$^2$, and heated a second time under flowing oxygen at 750° C. for 16 hours. The product was crushed, ground, and sieved to less than 32 μm. The regrinding and reheating process was performed to insure complete reaction of the reactants to form the product.

In a similar manner, particles of $LiNi_{0.6}Co_{0.05}Mg_{0.3}Al_{0.05}O_2$ were prepared by firstly mixing powders of $LiNO_3$, $NiCO_3$, $CoCO_3$, $Mg(OH)_2$, and $Al(OH)_3$ at a desired stoichiometric ratio to form a reaction mixture. The reaction mixture was then heated at 750° C. under an oxygen stream for 24 hours. The composition of the resulting mixed metal oxides was confirmed by using X-ray diffraction.

Example 2: Production of $LiNi_{0.8}Co_{0.05}Be_{0.05}Ca_{0.1}O_2$ Particles The $LiNi_{0.8}Co_{0.05}Be_{0.05}Ca_{0.1}O_2$ particles were synthesized by following a procedure similar to that in Example 1, with the exception that $Mg(OH)_2$ and $Al(OH)_3$ were replaced by $Ca(OH)_2$ and $Be(OH)_2$.

Figure 3:
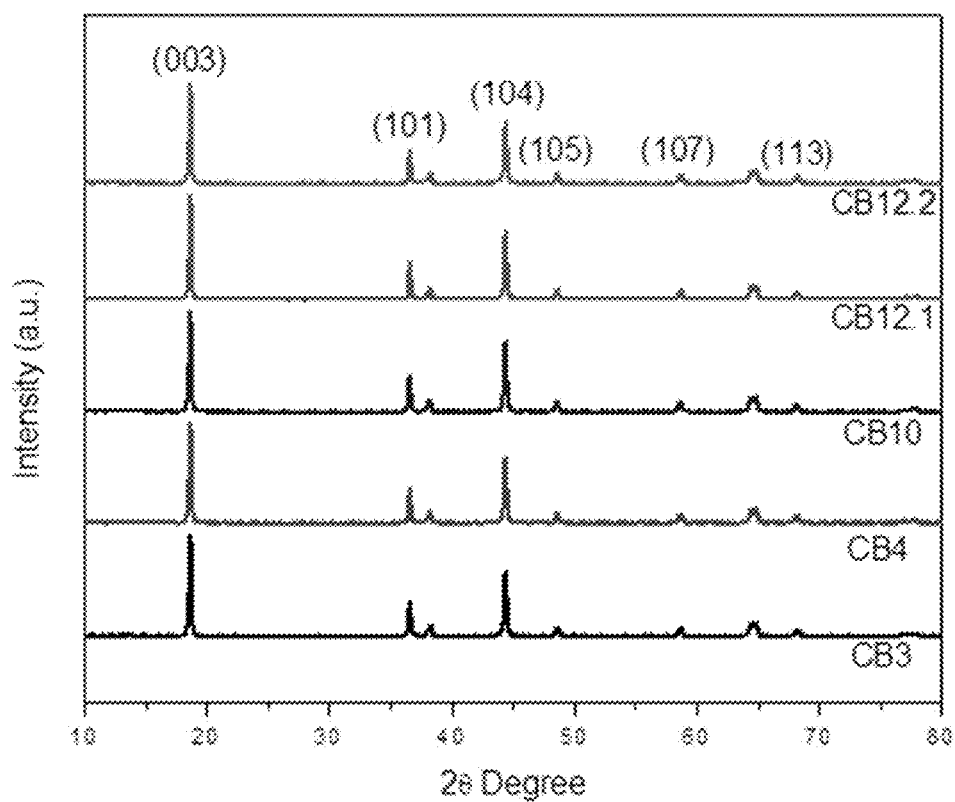
FIG. 3 X-ray diffraction curves of certain cathode active materials herein produced.
Figure 4:
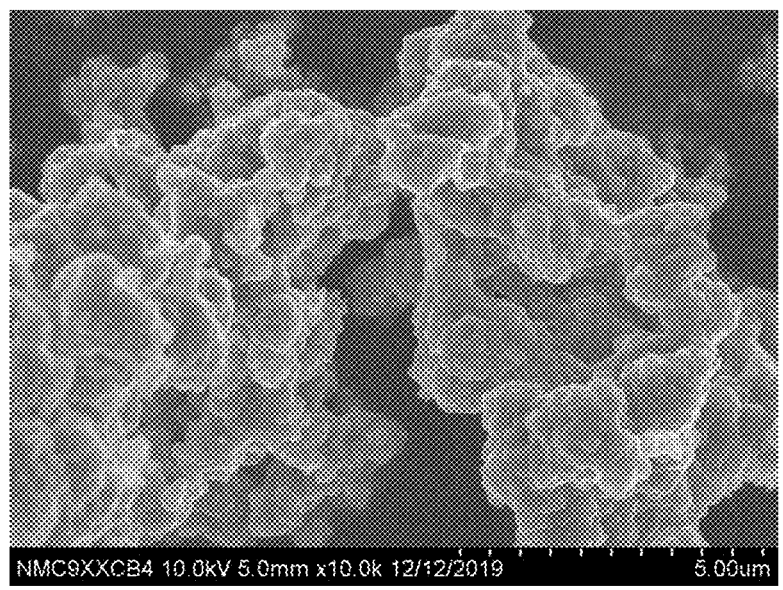
FIG. 4 SEM image of certain cathode active material particles.
Figure 5:
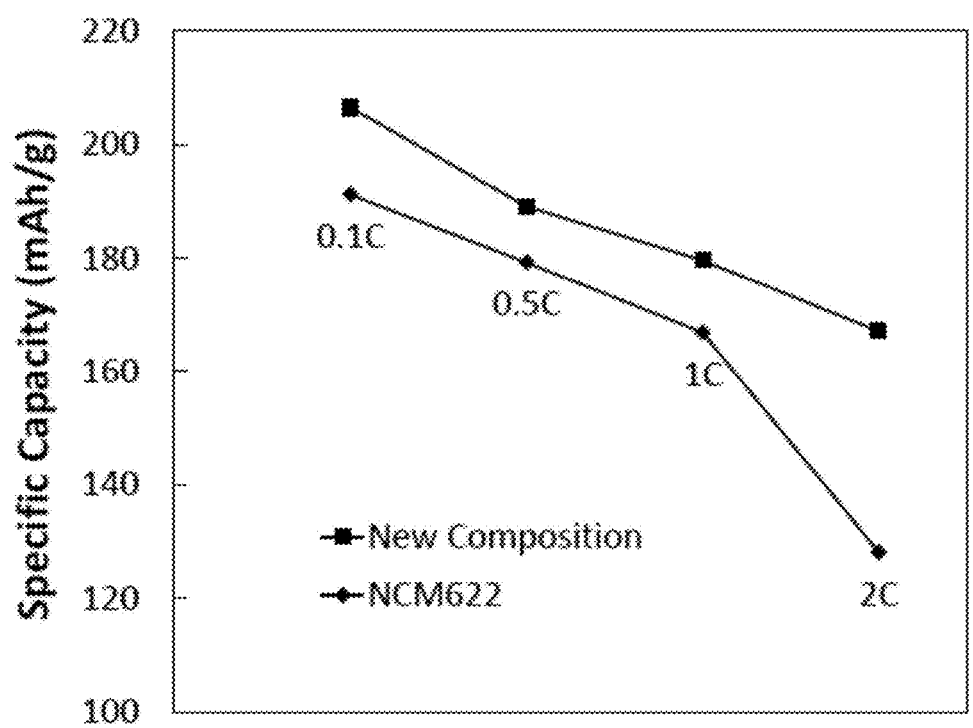
FIG. 5 Specific capacities of $LiNi_yCo_zMg_{0.5w}Ca_{0.5w}O_2$ tested at different C rates (1C rate=discharge or charge in 1 hour, nC rate=discharge or charge in 1/n hours).

Example 3: Production of $LiNi_yCo_zMg_wO_2$ and $LiNi_yCo_zMg_{0.5w}Ca_{0.5w}O_2$ Synthesis of the Ni-rich cathode materials $LiNi_yCo_zM_wO_2$ (M=Mg) involved co-precipitation and calcination. In an experiment, for instance, two solutions were firstly prepared: (i) solution A, an aqueous mixture of $NiSO_4 \cdot 6H_2O$, $CoSO_4 \cdot 7H_2O$, and $MgSO_4$ in designed ratios; and (ii) solution B, an aqueous mixture of NaOH (0.5~2.0 M) and $NH_4OH$ (0.5~1.3 M). Substantially equivalent amounts of solution A and solution B were simultaneously pumped into the reactor. The pH of the reactant solution was maintained at a value from 10 to 12. Nitrogen gas was introduced to avoid the oxidation of precursors. The required co-precipitation reaction time was approximately 5-24 hours. Then, the formed greenish $Ni_aCo_bMg_c(OH)_2$ precursor was filtered and washed repeatedly with deionized water until the pH of the filtrate was close to 7.0. The filtered powders were dried at 120° C. for 10 h. For the subsequent calcination process, the $Ni_aCo_bMg_c(OH)_2$ precursor was thoroughly mixed with $LiOH \cdot H_2O$ (molar ratio 1:1.02~1.10) using mortar and pre-calcinated at 500~550° C. for 5-10 h, followed by heating at 650~800° C. for 12-24 h with flowing oxygen gas. X-ray diffraction curves of several samples herein produced are shown in FIG. 3. Shown in FIG. 4 is an SEM image of the cathode active material particles herein produced.

A similar process was followed to produce the lithium mixed transition metal oxides with M=combined Mg and Ca by replacing half of the $MgSO_4$ with $CaSO_4$. FIG. 3 shows the specific capacities of $LiNi_yCo_zMg_{0.5w}Ca_{0.5w}O_2$ tested at different C rates. They perform much better as compared with the current industry standard NCM622.

Example 4: Production of PEDOT:PSS-Embedded $LiNi_{0.6}Co_{0.05}Mg_{0.3}Al_{0.05}O_2$ Particles Several types of $LiNi_{0.6}Co_{0.05}Mg_{0.3}Al_{0.05}O_2$ particles materials in a particle form, as prepared in Example 1, were investigated. These are used as examples to illustrate the best mode of practice.

Poly(3,4-ethylenedioxythiophene):polystyrene sulfonate (PEDOT:PSS) is a polymer mixture of two ionomers. One component is made up of sodium polystyrene sulfonate, which is sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS is initially soluble in water. If a curing agent is used, the polymer may be further cured to increase the degree of cross-linking.

Cathode active material particles were dispersed in a PEDOT/PSS-water solution to form a slurry (2-8% by wt. solid content), which was spray-dried to form micro-droplets of PEDOT/PSS-embedded cathode active material particles.

Example 5: Composite Particulates Containing $LiNi_{0.8}Co_{0.05}Be_{0.05}Ca_{0.1}O_2$ Particles Embedded in Polypyrrole (PPy) Gel Network The process of example 1 was replicated with PEDOT/PSS being replaced by polypyrrole (PPy) network. The polypyrrole hydrogel was prepared by following the following procedure: Solution A was prepared by mixing 1 mL $H_2O$ and 0.5 mL phytic acid together and then injecting 142 μL pyrrole into the solution, which was sonicated for 1 min. Solution B was prepared by dissolving 0.114 g ammonium persulfate in 0.5 mL $H_2O$. The solution A and B were separately cooled to 4° C. and then solution B was added into solution A quickly to form a reacting precursor solution.

The $LiNi_{0.8}Co_{0.05}Be_{0.05}Ca_{0.1}O_2$ particles were dispersed in a reacting precursor solution, along with optional graphene sheets, to form a suspension, which was rapidly spray-dried to form micro-droplets. These micro-droplets contain both cathode active material particles and optional graphene sheets embedded in polypyrrole hydrogel. The micro-droplets were partially or totally dried by removing portion or all of the water content from the gel under vacuum at 60° C. to form composite particulates comprising cathode active material particles dispersed in the conductive polymer network.

Example 6: Production of Polyaniline Gel Network-Encapsulated $LiNi_yCo_zMg_wO_2$ and $LiNi_yCo_zMg_{0.5w}Ca_{0.5w}O_2$ Particles The precursor may contain a monomer, an initiator or catalyst, a crosslinking or gelating agent, an oxidizer and/or dopant. As an example, 3.6 ml aqueous solution A, which contained 400 mM aniline monomer and 120 mM phytic acid, was added and mixed with 280 mg desired cathode active materials ($LiNi_yCo_zMg_wO_2$ and $LiNi_yCo_zMg_{0.5w}Ca_{0.5w}O_2$ particles, respectively). Subsequently, 1.2 ml solution B, containing 500 mM ammonium persulfate, was added into the above mixture and subjected to bath sonication for 1 min. The mixture suspension was spray-dried to form micro-droplets. In about 5 min, the solution changed color from brown to dark green and became viscous and gel-like, indicating in-situ polymerization of aniline monomer to form the PANi hydrogel. The micro-droplets were then vacuum-dried at 50° C. for 24 hours to obtain PANi network polymer-encapsulated cathode active material particles.

The resulting composite particulates, along with a SBR binder, and Super-P conductive additive were then made into a cathode electrode.

Examples 7: Heparin-Based Material as a Curing Agent for the Preparation of a Conducting Polymer Network The encapsulating conducting polymer may be produced from a monomer using heparin-based crosslinking or gelating agent (e.g. in addition to phytic acid). Aqueous solutions of heparin (0.210% w/w) were prepared using 5M NaOH. Photo-cross-linkable heparin methacrylate (Hep-MA) precursors were prepared by combining heparin (porcine source, Mw ~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm compared to peak corresponding to methyl groups in heparin at 2.05 ppm.

Solutions used for photopolymerization were incubated with 2-methyl-1-[4-(hydroxyethoxy)phenyl]-2-methyl-1-propanone (Irgacure 2959) to create final concentrations of 0.5% (w/w) of photoinitiator. Gels were photo-cross-linked using UV illumination for 30-60 min ($\lambda$max=365 nm, 10 mW/cm$^2$). Hep-MA/PANI dual-networks were formed by sequentially incubating cross-linked Hep-MA hydrogels in aqueous solutions of ANI ([ANI]$_0$, between 0.1 and 2 M, 10 min) and acidic solutions of APS ([APS]$_0$, between 12.5 mM and 2 M, 20120 min). The gel fraction of Hep-MA/PANI dual networks was recovered by washing in di H$_2$O after oxidative polymerization. Particles of a desired cathode active material could be added into the reacting mass during various stages of reactions, but preferably added right before photopolymerization.

Example 8: Preparation and Electrochemical Testing of Various Battery Cells

For most of the cathode active materials investigated, we prepared lithium-ion cells or lithium metal cells using the conventional slurry coating method. A typical cathode composition includes 85 wt. % active material (e.g., graphene-encapsulated cathode particles), 7 wt. % acetylene black (Super-P), and 8 wt. % polyvinylidene fluoride binder (PVDF, 5 wt. % solid content) dissolved in N-methyl-2-pyrrolidine (NMP). After coating the slurries on Al foil, the electrodes were dried at 120° C. in vacuum for 2 h to remove the solvent. An anode layer (e.g. Li metal for a half cell test), a porous separator layer (e.g. Celgard 2400 membrane), and a cathode layer are then laminated together and housed in a plastic-Al envelop. The cell is then injected with 1 M LiPF$_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g.

Figure 6:
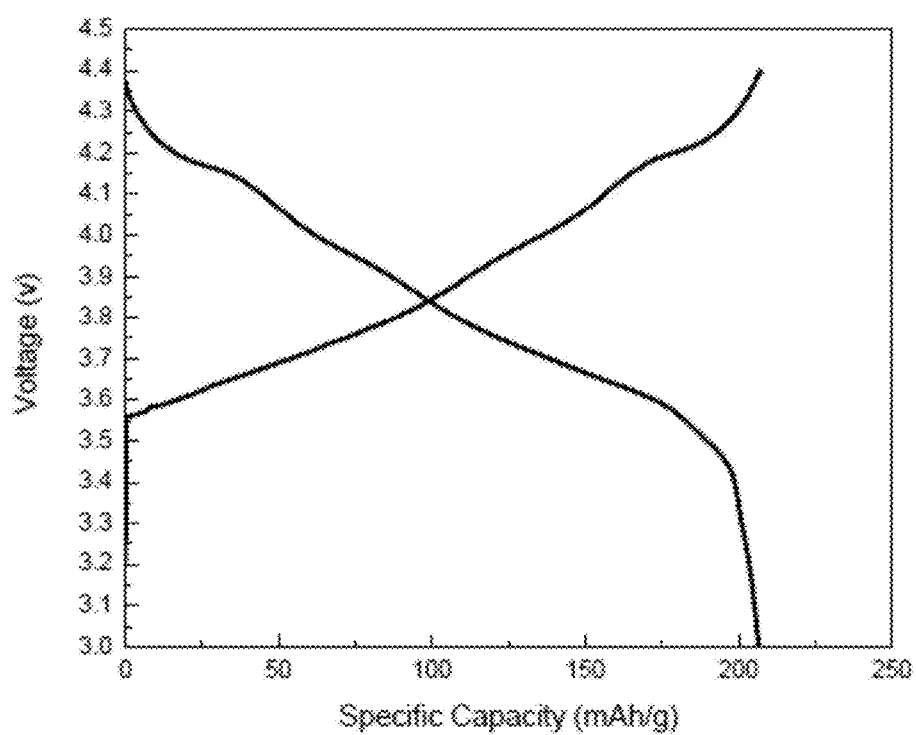
FIG. 6 Charge-discharge curves of a $LiNi_yCo_zMg_wO_2$ material.
Figure 7:
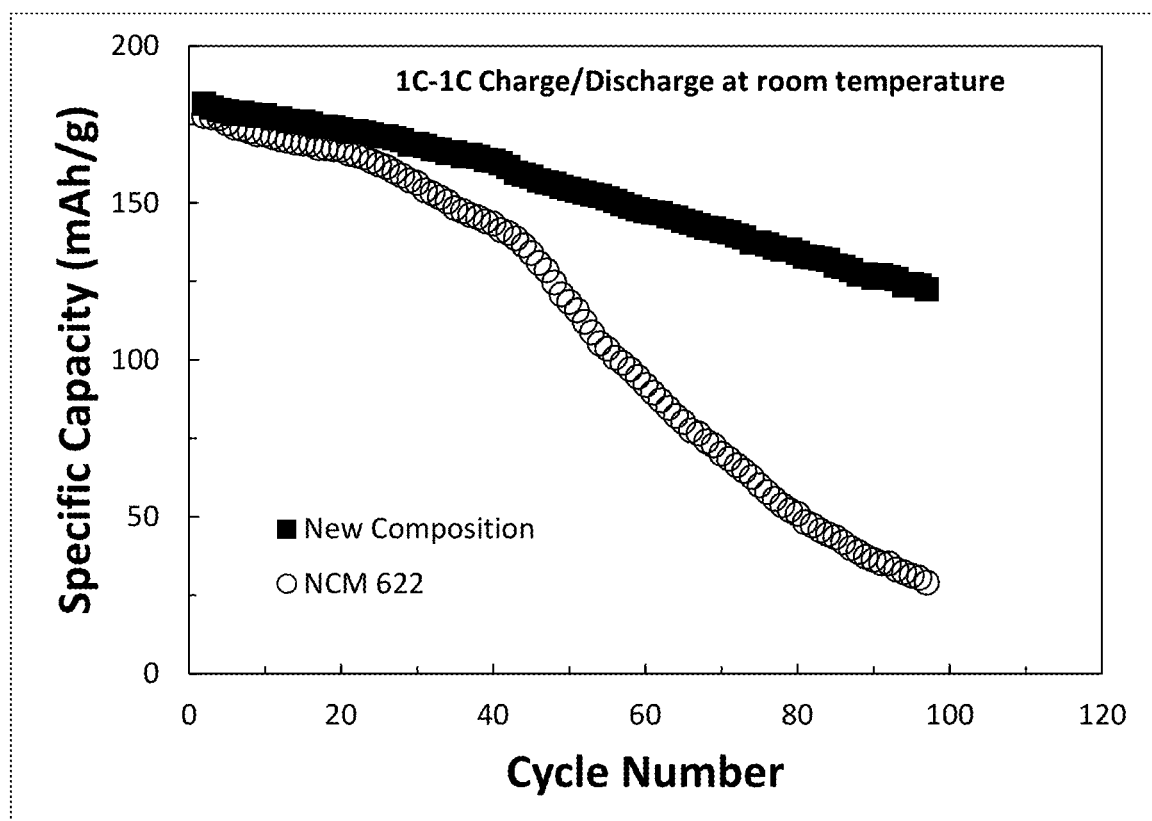
FIG. 7 Discharge capacities of a $LiNi_yCo_zMg_wO_2$ material and those of a conventional NCM-622 cathode material plotted as a function of charge/discharge cycle number.

FIG. 6 shows the charge-discharge curves of a LiNi$_y$Co$_z$Mg$_w$O$_2$ material herein produced, indicating a specific capacity higher than 200 mAh/g. Shown in FIG. 7 are the discharge capacities of a LiNi$_y$Co$_z$Mg$_w$O$_2$ material and those of a conventional NCM-622 cathode material plotted as a function of charge/discharge cycle number. These data have demonstrated that the presently disclosed cathode active material is superior to the most widely used cathode active materials in terms of cycling stability.

We have further observed that the presence of a conducting polymer network-based encapsulating shell can significantly improve the rate capability and cycling stability of the cathode active materials. These cathode particulates, when tested under higher charge/discharge rates, exhibit higher specific capacities as compared to the corresponding cathode particles without conducting polymer network protection. Furthermore, the presence of a conducting polymer network shell appears to enable the charge potential of a lithium cell to be pushed to higher than 4.5 V, thereby further increasing the cell energy densities.

The invention claimed is:

1. A composite particulate for use in a lithium battery cathode, said composite particulate comprising one or a plurality of particles of a cathode active material encapsulated by or embedded in an electrically and/or ionically conducting polymer gel network, wherein the cathode active material is selected from the group of lithium nickel cobalt metal oxides having a general formula Li$_x$Ni$_y$Co$_z$M$_w$O$_2$, where M is selected from the group consisting of beryllium (Be), calcium (Ca), and combinations thereof with aluminum (Al), titanium (Ti), tungsten (W), chromium (Cr), molybdenum (Mo), magnesium (Mg), tantalum (Ta), silicon (Si), and x ranges from greater than 0 to 1.2, the sum of y+z+w ranges from 0.8 to 1.2, w ranges from 0.25 to 0.5, y and z are both greater than zero, and the ratio z/y ranges from 0 to 0.5.

2. The composite particulate of claim 1, wherein M comprises elements selected from combined Be and Mg, combined Ca and Mg, combined Ca and Be, or combined Be, Mg, and Ca.

3. The composite particulate of claim 1, wherein said cathode active material is in a form of fine particles having a dimension from 10 nm to 30 μm.

4. The composite particulate of claim 1, wherein said cathode active material is in a form of fine particles having a dimension from 50 nm to 10 μm.

5. The composite particulate of claim 1, further comprising graphene sheets that are embedded in said conducting polymer gel network.

6. The composite particulate of claim 5, wherein said graphene sheets are selected from pristine graphene, graphene oxide, reduced graphene oxide, graphene fluoride, graphene chloride, graphene bromide, graphene iodide, nitrogenated graphene, hydrogenated graphene, doped graphene, chemically functionalized graphene, or a combination thereof.

7. The composite particulate of claim 1, wherein said electrically conducting polymer gel network comprises a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

8. The composite particulate of claim 1, wherein said electrically conducting polymer gel network comprises a polyaniline hydrogel, polypyrrole hydrogel, or polythiophene hydrogel in a dehydrated state.

9. The composite particulate of claim 1, wherein said ionically conducting polymer gel network comprises a polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

10. The lithium-ion cell or lithium metal secondary cell of claim 9, wherein said anode comprises an anode active material selected from the group consisting of: (a) silicon (Si), germanium (Ge), phosphorus (P), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, P, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium niobium oxide, lithium titanium-niobium oxide, lithium aluminate, lithium-containing titanium oxide, lithium transition metal oxide, $ZnCo_2O_4$; (f) particles of graphite; (g) lithium metal or lithium alloy containing greater than 80% by weight of lithium; and combinations thereof.

11. The composite particulate of claim 1, wherein said electrically or ionically conducting polymer gel network is reinforced with a high-strength material selected from carbon nanotubes, carbon nano-fibers, carbon or graphite fibers, graphene sheets, expanded graphite flakes, polymer fibrils, glass fibers, ceramic fibers, metal filaments or metal nanowires, whiskers, or a combination thereof.

12. The composite particulate of claim 1, wherein said particulate further comprises from 0.1% to 40% by weight of a lithium ion-conducting additive dispersed in said electrically or ionically conducting polymer gel network.

13. The composite particulate of claim 12, wherein said lithium ion-conducting additive is selected from $Li_2CO_3$, $Li_2O$, $Li_2C_2O_4$, LiOH, LiX, $ROCO_2Li$, HCOLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

14. The composite particulate of claim 12, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

15. A powder mass comprising multiple composite particulates of claim 1.

16. A cathode comprising the powder mass of claim 15 as a cathode active material for a lithium-ion cell or lithium metal secondary cell.

17. A lithium-ion cell or lithium metal secondary cell comprising an anode, a cathode of claim 16, and an electrolyte in ionic contact with the anode and the cathode.

18. A process of producing multiple composite particulates of claim 1, the process comprises (A) dispersing multiple particles of the cathode active material in a reacting mass comprising an oligomer or a monomer, an initiator or catalyst, and a curing or cross-linking agent to form a reacting slurry; (B) forming the reacting slurry into multiple reacting droplets, wherein the droplet comprises one or a plurality of cathode active material particles dispersed in a matrix of polymerizing or cross-linking chains; and (C) converting the polymerizing or cross-linking chains into a network polymer in the droplets to form the composite particulates.

19. The process of claim 18, wherein Step (B) of forming reacting droplets comprises operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, or a combination thereof.

* * * * *